United States Patent [19]

DuPont et al.

[11] Patent Number: 4,490,314

[45] Date of Patent: * Dec. 25, 1984

[54] RADIATION CURED SILICONE RUBBER ARTICLES

[75] Inventors: John G. DuPont, Reading, Mass.; Paul A. Goodwin, Amherst, N.H.

[73] Assignee: High Voltage Engineering Corporation, Burlington, Mass.

[*] Notice: The portion of the term of this patent subsequent to Dec. 7, 1999 has been disclaimed.

[21] Appl. No.: 431,561

[22] Filed: Sep. 30, 1982

Related U.S. Application Data

[62] Division of Ser. No. 211,252, Nov. 28, 1980, Pat. No. 4,362,674.

[51] Int. Cl.³ .............................................. B29C 25/00
[52] U.S. Cl. ................................ 264/22; 204/159.13; 264/83; 264/209.6; 264/347
[58] Field of Search ..................... 204/159.13; 264/22, 264/83, 209.6, 347; 528/21

[56] References Cited

U.S. PATENT DOCUMENTS 2,763,609  9/1956  Lewis et al. .......................... 264/22
3,065,158  11/1962  Zack, Jr. ............................. 204/154

FOREIGN PATENT DOCUMENTS 743950  1/1956  United Kingdom .

Primary Examiner—Paul Lieberman
Assistant Examiner—W. Thompson
Attorney, Agent, or Firm—Henry C. Nields

[57] ABSTRACT

A process for making radiation cured silicone rubber articles is disclosed wherein a hydroxyl-terminated polysilaxane having a molecular weight from about 50,000 to about 2,000,000, optionally modified by mixing with up to 85% of an end-stopped silicone rubber, is mixed with from about 10 to about 70 parts per hundred of rubber of a finely divided silica filler with a particle size in the reinforcing range and other inert fillers as determined by desired final properties; the composition so prepared is formed into the desired shape at room temperature; the article so formed is precured to improve the mechanical properties of the material with which it is made by exposure to ammonia gas, ammonium hydroxide, or to the vapors or solutions of a volatile amine at room temperature; and the precured article is irradiated with high energy electrons or gamma radiation to effect a permanent cure of the material from which the article is formed.

1 Claim, No Drawings

RADIATION CURED SILICONE RUBBER ARTICLES

This application is a division of application Ser. No. 211,252, filed Nov. 28, 1980, now U.S. Pat. No. 4,362,674.

BACKGROUND

I. Field of Invention

The present invention relates to processes for making radiation cured silicone rubber articles, and, in particular, to a process wherein articles formed of silicone rubber are treated substantially immediately after their formation to withstand without serious deformation the stresses involved in the mechanical handling necessary to convey such articles through irradiation apparatus.

II. Summary of the Prior Art

Unlike some of the organic rubbers, particularly the newer thermoplastic rubbers, silicone rubber must be crosslinked or vulcanized in order to have useful properties. The crosslinking process is usually referred to, in the case of silicone rubber as "cure" or "curing." Since the invention of silicone rubber, the cure has been done by incorporating free radical producing catalysts, typically organic peroxides or azo compounds, mixed with rubber and heating the composition to a high temperature, typically 150°–250° C., for periods ranging from a few minutes to several hours.

Virtually all commercial, heat-cured silicone rubbers today are cured with organic peroxides such as benzoyl peroxide, dichlorobenzoyl peroxide, tert-butyl perbenzoate or dicumyl peroxide. However, products cured by such curing agents all suffer from a disadvantage in that, after cure has been completed, the products contain chemical residues from the decomposition of the peroxide, and these residues tend to affect deleteriously properties such as heat-ageing, electrical resistivity and reversion resistance. The presence of these residues, moreover, limits the use of otherwise biologically inert silicone rubber products in medical applications, since the residues tend to be leached out of the rubber by body fluids, saline solutions and other liquid products used in medicine.

There are other problems of peroxides curing catalysts. One is that they are very sensitive to catalyst "poisons" and many common rubber compounding ingredients, which otherwise would be included in silicone rubber to improve physical strength, flame retardancy, thermal ageing, and so on, cannot be used because they prevent or retard the peroxide cure. For example, most reinforcing carbon blacks, commonly used in organic rubbers, completely prevent peroxide cure of silicones. Certain peroxide residues, being volatile, cause porosity in the cured rubber and others tend to diffuse out of the compound forming unsightly oily films or crystals on the surface.

More recently, liquid silicone rubbers have been introduced to the market, which cure by other mechanisms to solid, vulcanized rubber products. These liquid rubbers (which occasionally are pastes or semi-solids) typically cure at room temperature, or at relatively low temperatures, and are categorically referred to as "Room Temperature Vulcanizing" (RTV) silicone rubbers. There are several mechanisms for curing RTV rubbers. Some contain crosslinking agents which are activated by atmospheric moisture and others are cured by complex catalysts containing platinum salts. All of them yield chemical byproducts from the curing reaction, some of them relatively toxic chemicals such as organic amines, acetic acid or methanol. They all, therefore, suffer from the disadvantages cited for peroxide cure, above.

It has long been known that these disadvantages can be avoided, and that cured silicone rubber parts free of deleterious catalyst residues can be obtained, by irradiation with high energy electrons or gamma rays, to effect the cure. For example, the curing of silicone rubber with electrons was disclosed and claimed in U.S. Pat. No. 2,763,609 to Lewis, et al. This curing process and the benefits resulting therefrom are discussed in detail in that patent, the disclosure of which is incorporated herein by reference. In spite of the significant advantages of the irradiation curing process, however, it has never been commercialized, to the best of our knowledge, because of a serious obstacle to production of commercial quantities of formed, irradiated silicone parts. The problem is that Silicone rubber, like other curable polymers, must usually be formed into the desired, final shape before cure because, after cure, it is crosslinked and, therefore, not formable by the usual processes such as molding, extrusion, or casting.

Yet unlike most other polymers, silicone rubber is almost completely lacking in physical strength before cure. Uncured silicone rubber is extremely soft, easily deformed even by working with the bare hands, and it flows readily under low pressures, such as might be experienced when winding a silicone tube or sheet on a reel. Cure, whether by peroxide catalysts or by irradiation, improves the physical strength of silicone rubber dramatically. Tensile strength, for example, is increased 20–50 times.

Because of its low precure strength (referred to in the trade as "green strength"), it is impossible to convey extruded silicone tubing, or extruded silicone insulated wire, for example, from the extruder to the radiation vault, and to convey it under the electron beam repeatedly, without serious physical damage. If the silicone rubber is to be formed by molding, it is nearly impossible to remove it from the mold without damage, in order to irradiate it. Of course, it cannot be radiation-cured while still in the mold, at least by electron irradiation, because the electrons cannot penetrate the thick metal walls of a typical mold. This problem has prevented commercialization of the radiation cure process.

SUMMARY OF THE PRESENT INVENTION

It is, therefore, an object of this invention to provide a practical process for curing silicone rubber formed objects by the use of high energy radiation and, particularly, by the use of high energy electrons.

It is a further object to cure silicone rubber without the use of heat energy, and without the use of chemical agents or catalysts which leave deleterious residues in the rubber.

A still further object is to effect an apparent cure of silicone rubber formed objects, immediately after the forming process, so that they can be handled, stored and conveyed through irradiation equipment without physical damage.

The present invention is based on the unexpected discovery that a compound of silicone rubber at least 15% of which has, predominantly, silanol end groups, and a finely divided silica filler with a particle size in the reinforcing range, is strengthened markedly by a brief exposure, at room temperature, to ammonia gas, or ammonium hydroxide, or to the vapors or solutions of a volatile amine. Although it seems likely (although not proven) that this strengthening does not result from permanent, chemical crosslinking, but is, rather, an apparent and somewhat transient cure, the increase in mechanical properties obtained is more than adequate to enable the formed object, whether it be an extruded tube, wire insulation, thin sheet or molded object, to withstand the severe tensile, compressive and abrasive stresses involved in the mechanical handling necessary to convey it through irradiation apparatus.

Crosslinking by irradiation with high energy electrons then introduces permanent, primary bond crosslinks. At least in the case of ammonia gas as the precure agent, the ammonia which diffuses into the compound to effect the precure seems to diffuse back out during, or soon after irradiation, and is not detectable by sensitive analytical techniques. Thus, crosslinking has been effected without leaving measurable chemical residues.

DETAILED DESCRIPTION OF A PREFERRED EMBODIMENT OF THE PRESENT INVENTION

In the preferred embodiment of the invention, a hydroxyl-terminated polysiloxane having a molecular weight from about 50,000 to about 2,000,000, optionally modified by mixing with up to 85% of an end-stopped silicone rubber polymer, is mixed with from about 10 to about 70 parts per hundred of rubber of a fumed silica. Other inert fillers may be added to obtain desired property profiles. Suitable mixing equipment includes such high shear mixers as two-roll compounding mills or sigmablade doughmixers.

The resulting compound is then formed to the desired final shape by an appropriate forming process. That is, tubes or rods are extruded through a die from a rubber extruder; wire insulation is extruded onto bare wire through a crosshead extruder; flat sheets are calendered or extruded through a slit die, and so on. Forming is normally carried out at or near room temperature.

The fabricated rubber is then conveyed immediately through an atmosphere of ammonia or amine vapors, allowing a residence time in the vapors of from about 10 seconds to about 60 minutes, depending on the sample thickness and degree of cure required. The precuring step is also preferably carried out at or about room temperature.

The fabricated rubber, which has now been strengthened greatly by the precuring process is then crosslinked by exposure to high energy radiation. High energy electrons are preferred as the radiation source, but gamma radiation may also be used. The radiation dose may be from about 1 megarad to about 50 megarads with an optimum range from 5 megarads to 20 megarads.

For silicone rubber polymers to have useful mechanical properties they must be compounded with fillers of extremely small particle size, generally less than about 50 m$\mu$ in diameter and a high surface area, generally more than 150 M$^2$/g. This type of filler is known as a "reinforcing filler" as opposed to a filler of larger particle size and a smaller surface area which contributes little to the mechanical strength of a rubber, but rather serves primarily to reduce the cost of the compound. The reinforcing fillers used in silicone rubber are generally finely divided silicas, although carbon black fillers may also be used. The use of such "reinforcing fillers" is well known in the prior art and is described, for example, at pages 405-423 of "Reinforcement of Elastomers", edited by Gerard Kraus (Interscience Publishers, New York) in a chapter by John W. Sellers and Frank E. Toonder entitled, "Reinforcing Fine Particle Silicas and Silicates".

For the operation of this invention silica fillers are essential. Fumed silicas are preferred. Fumed or pyrogenic silica comprises a form of silica described in U.S. Pat. No. 2,888,424. Such silicas are sold under the trade designation Cabosil, by the Cabot Corporation of Boston, Mass. Another type of silica known as silica aerogel, not now sold commercially, but previously sold under the trade designation Santocel by the Monsanto Chemical Company, is also effective. Silica aerogels are described, for example, in U.S. Pat. Nos. 2,657,149 and 2,093,454.

Although fumed silicas or silica aerogels, or other equally finely divided silicas are essential to the process disclosed herein, they may be used in conjunction with other inert fillers or additives conventionally used to alter specific properties, reduce cost, or as pigments. Such fillers include clays, metal oxides, carbon black, and larger particle size silicas. Fillers may be process aids (such as silicone oil and a reinforcing filler), flame retardants, pigments, stabilizers, etc. It is well known that fillers may be surface coated or otherwise treated.

In order to illustrate the improved properties attainable with this invention the following examples are presented. These examples are presented by way of disclosure only and should not be construed as being in any way limiting. In these examples SE-30 refers to a linear end-capped polydimethylsiloxane gum produced by General Electric Company; SE-33 refers to a linear end-capped polydimethyl-vinylsiloxane gum produced by General Electric Company; SE-75 refers to a linear non-end-capped polydimethylsiloxane gum produced by General Electric Company; Cabosil MS-7 refers to a pyrogenic, high surface area silica produced by the Cabot Corporation; Hisil 233 refers to a medium surface area silica produced by PPG Industries, Inc.; Imsil A-10 refers to a low to medium surface area silica produced by Illinois Minerals Company; Santocel-C refers to a silica aerogel previously produced by the Monsanto Chemical Company; and washed P.D.M.S. refers to a polydimethylsiloxane having, predominantly, silanol end-groups. The latter polymers may be made by the KOH-catalyzed polymerization of octamethylcyclotetrosiloxane as disclosed in Warrick U.S. Pat. No. 2,541,137, issued Feb. 13, 1951 and subsequent removal of potassium ions by washing the polymer with water, or by other suitable techniques. Such polymers will hereinafter be referred to as "hydroxyl-terminated polydimethylsiloxanes."

It will, of course, be understood by those skilled in the art that the reactive components are the silanol end-groups, and that the structure of the silicone chain may be varied considerably without departing from the scope of this invention. Thus, hydroxyl-terminated polysiloxanes, in which some of the methyl groups have been replaced by other aliphatic, aromatic, or cycloaliphatic radicals such as ethyl, vinyl, allyl, phenyl, etc. may also be employed. Methyl-phenyl type copolymers will probably require relatively higher dosage of irradiation. Similarly some of the methyl groups may be replaced by fluorinated, or other halogenated radicals.

The controlled precure which is obtained by exposing hydroxyl-terminated polysiloxane rubber compounds to ammonia or amines is highly specific to the hydroxyl-terminated polymer as is clearly demonstrated by the data presented hereinbelow in Example I. Most commercial silicone rubber gums are linear polysiloxanes whose molecules are terminated with trimethylsilyl or other inert groups. When compounded with a silica filler, the resulting compounds are completely unaffected by ammonia or amines. On the other hand, a KOH-catalyzed polymer, as disclosed in the Warrick U.S. Pat. No. 2,541,137, made without trimethylsilyl endgroups, and still containing the potassium ions (i.e., not water washed) develops an apparent cure rapidly, when compounded with the silica filler, to such an extent that it is difficult to form by extrusion, molding, calendering, etc.

However, it is possible to blend conventional silicone rubber polymers, endstopped with trimethylsilyl, or other monofunctional silyl groups, with the hydroxyl-terminated polysiloxane up to 85% of the mixture, and to obtain a useful degree of precure when exposed to ammonia or amine vapors.

EXAMPLE I

In the first series of experiments, various silicone polymers and fillers were mixed together at room temperature on a laboratory two-roll mill. The compounds were then stripped from the mill and pressed into 100 mil-thick sheets on a water-cooled laboratory press. The sheets were then exposed to an atmosphere of anhydrous ammonia for 10 minutes. These results are summarized in Table I.

TABLE I

|  | A | B | C | D | E | F | G | H | I | J |
|---|---|---|---|---|---|---|---|---|---|---|
| SE-33 | 100 |  | 100 |  |  |  |  |  | 50 |  |
| SE-30 |  | 100 |  |  |  |  |  |  |  |  |
| SE-75 |  |  |  | 100 | 100 | 100 |  | 100 | 50 |  |
| Washed PDMS |  |  |  |  |  |  | 100 |  |  |  |
| Cabosil MS-7 | 25 | 25 |  |  |  | 25 | 30 |  | 30 |  |
| Hisil 233 |  |  | 25 | 25 |  |  |  |  |  |  |
| Imsil A-10 |  |  |  |  | 25 |  |  |  |  |  |
| Santocel-C |  |  |  |  |  |  |  | 30 |  |  |
| Tensile (psi) Prior to NH₃ Exposure | Nil | Nil | Nil | Nil | Nil | Nil | Nil | Nil | Nil |  |
| Tensile (psi) After NH₃ Exposure | ↓ | ↓ | ↓ | ↓ | ↓ | 300 | 850 | 220 | 450 |  |
| % Elongation After NH₃ Exposure | ↓ | ↓ | ↓ | ↓ | ↓ | 700 | 750 | 350 | 900 |  |

EXAMPLE II

In this example various amounts of pyrogenic silica were compounded with a non-end blocked polydimethylsiloxane gum (SE-75) and cured with anhydrous ammonia for 10 minutes. These data are summarized in Table II:

TABLE II

|  | A | B | C | D | E |
|---|---|---|---|---|---|
| SE-75 Non-end Capped Polydimethylsiloxane Polymer (Parts) | 100 | 100 | 100 | 100 | 100 |
| Cabosil MS-7 (phr) | 15 | 25 | 30 | 35 | 45 |
| Tensile After 10 Minutes' Exposure to NH₃ (psi) | 50 | 300 | 600 | 1100 | 1300 |
| % Elongation After 10 Minutes' Exposure to NH₃ | 400 | 700 | 750 | 800 | 750 |

EXAMPLE III

In this series of experiments, a formulation containing 100 parts of non end-capped polydimethylsiloxane gum and 40 parts of fumed silica were exposed to vapors of various organic amines for a period of 10 minutes. Tensile and elongation tests were then performed on these samples. The data are summarized in Table III.

TABLE III

| COMPOUND | AMINE | TENSILE/ELONGATION PRIOR TO EXPOSURE | TENSILE/ELONGATION AFTER EXPOSURE |
|---|---|---|---|
| 100 g. SE-75 40 g. fumed silica | Methyl-Amine | Nil | 970-500 |
| 100 g. SE-75 40 g. fumed silica | Dimethyl-Amine | Nil | 1050/550 |
| 100 g. SE-75 40 g. fumed silica | Trimethyl-Amine | Nil | 1050/600 |
| 100 g. SE-75 40 g. fumed silica | Allyl-Amine | Nil | 900/600 |
| 100 g. SE-75 40 g. fumed silica | Pyridine | Nil | 1050/650 |

As can be seen from this data, organic primary, secondary and tertiary amine vapors may be used to provide a pseudocure to the silicone rubber.

EXAMPLE IV

In this series of experiments, a formulation composed of 100 parts non-end capped polydimethylsiloxane gum and 40 parts of fumed silica were cured with anhydrous ammonia and then irradiated with high-energy electrons to specified doses. Tensile and elongation tests were performed on unaged specimens, specimens aged at 220° C. for 50 hours, and specimens aged in boiling water (100° C.) for 50 hours. These data are summarized in Table III.

TABLE IV

|  | DOSE (Mrads) | | | |
|---|---|---|---|---|
|  | 0 | 2 | 5 | 10 |
| Initial Tensile Strength (psi) | 1200 | 1100 | 850 | 800 |
| Initial Elongation (%) | 500 | 420 | 250 | 125 |

TABLE IV-continued

| | DOSE (Mrads) | | | |
|---|---|---|---|---|
| | 0 | 2 | 5 | 10 |
| Tensile After 50 Hours at 220° C. (psi) | 450 | 650 | 850 | 750 |
| Elongation After 50 Hours at 220° C. (%) | 350 | 325 | 200 | 50 |
| Tensile After 50 Hours in Water at 100° C. | <100 | 650 | 850 | 700 |
| Elongation After 50 Hours in Water at 100° C. | <50 | 450 | 250 | 100 |

As can be seen from these data, a permanent cure is effected by irradiation with high-energy electrons.

EXAMPLE V

In this series of experiments, two formulations were cured with anhydrous ammonia and irradiated by high-energy electrons to the desired dose. Specimens were then subjected to compression at elevated temperatures and the % permanent set measured. These results are given in Table V.

TABLE V

| FORMULATION | DOSE (MRADS) | COMPRESSION SET (%) (22 HOURS at 175° C.) |
|---|---|---|
| 100 g SE-75 40 g Cabosil MS-7 NH₃ Cure for 10 Minutes | 2 / 5 | 54 / 38 |
| 100 g SE-75 50 g Cabosil MS-7 NH₃ Cure for 10 Minutes | 2 / 5 | 33 / 27 |

EXAMPLE VI

In this series of experiments, a compound composed of 100 parts non-end blocked polydimethylsiloxane gum, 40 parts fumed silica (Cabosil MS-7) treated with CF-11 73 (a silicone fluid manufactured by General Electric Company) in accordance with U.S. Pat. No. 2,939,009, 40 parts non-reinforcing silica (Imsil A-10) and 2 parts red iron oxide were blended on a two-roll mill and prehardened by exposure to NH₃. The material was then permanently cross-linked by means of high energy electrons. This material, along with a conventional peroxide cured material (GE 9100-A) was then heat aged at 300° C. for 100, 250 and 350 hours. At the end of this time, physical properties were measured in order to determine the relative heat stability of these materials. These data are summarized in Table VI.

TABLE VI

| COMPOUND | DOSE (MRADS) | TENSILE/ELONGATION/DUROMETER | | | |
|---|---|---|---|---|---|
| | | INITIAL | 100 HRS. AT 300° C. | 250 HRS. AT 300° C. | 350 HRS. AT 300° C. |
| 100 parts non-end blocked PDMS 40 parts fumed silica 40 parts non-reinforcing silica 2 parts Fe₂O₃ | 10 | 930/160/68 | 575/135/67 | 475/100/77 | 530/65/73 |
| 100 parts non-end blocked PDMS 40 parts fumed silica 40 parts non-reinforcing silica 2 parts Fe₂O₃ | 20 | 950/100/72 | 470/75/70 | 465/50/85 | 515/50/80 |
| Peroxide cured polymethylvinylsiloxane (GE 9100-A) | (Peroxide cure) | 1000/400/55 | 545/100/75 | 460/0/97 | 700/0/96 |
| Peroxide cured polymethylvinylsiloxane (GE SE-9058) | (Peroxide cured) | 1100/400/59 | 690/75/85 | 600/30/93 | 550/0/95 |

As can be seen from these data, silicone crosslinked by high energy electrons appears to have superior heat stability (based on % elongation) as compared to peroxide crosslinked silicone.

It will be understood that the embodiments, product, process, and practices described and portrayed herein have been presented by way of disclosure, rather than limitation, and that various modifications, substitutions, and combinations may be effected without departure from the spirit and scope of this invention in its broader aspects.

We therefore claim:

1. An irradiated silicone rubber article produced in accordance with the following process:

(a) forming into a desired shape a mixture of (i) silicone gum which includes a substantial amount of one or more hydroxyl-terminated polydimethylsiloxanes having a molecular weight from about 50,000 to about 2,000,000 and in which some of the methyl groups may have been replaced by other organic aliphatic, aromatic, or cycloaliphatic radicals such as ethyl, vinyl, allyl, phenyl, or halogenated radicals of the foregoing types, and (ii) about 10 to about 70 parts per hundred of rubber of a finely divided silica filler with a particle size in the reinforcing range:

(b) treating the mixture so formed with a precuring agent selected from the group consisting of ammonia gas, ammonium hydroxide, vapors of a volatile amine, or a solution of a volatile amine; and (c) irradiating with high energy ionizing radiation the precured shape.

* * * * *